United States Patent
Spiteri et al.

(10) Patent No.: US 11,712,652 B2
(45) Date of Patent: Aug. 1, 2023

(54) METHODS FOR THE REMOVAL OF CO2 FROM ATMOSPHERIC AIR OR OTHER CO2-CONTAINING GAS IN ORDER TO ACHIEVE CO2 EMISSIONS REDUCTIONS OR NEGATIVE CO2 EMISSIONS

(71) Applicant: CLIMEWORKS AG, Zurich (CH)

(72) Inventors: Alexander Spiteri, Zurich (CH); Valentin Gutknecht, Zurich (CH); Jan Andre Wurzbacher, Zurich (CH); Christoph Gebald, Zurich (CH)

(73) Assignee: CLIMEWORKS AG, Zurich (CH)

( * ) Notice: Subject to any disclaimer, the term of this patent is extended or adjusted under 35 U.S.C. 154(b) by 31 days.

(21) Appl. No.: 16/344,065

(22) PCT Filed: Nov. 10, 2017

(86) PCT No.: PCT/EP2017/078837
§ 371 (c)(1),
(2) Date: Apr. 23, 2019

(87) PCT Pub. No.: WO2018/099709
PCT Pub. Date: Jun. 7, 2018

(65) Prior Publication Data
US 2020/0061519 A1 Feb. 27, 2020

(30) Foreign Application Priority Data

Nov. 29, 2016 (EP) ..................... 16201033

(51) Int. Cl.
| | | |
|---|---|---|
| C01B 32/05 | (2017.01) | |
| B01D 53/04 | (2006.01) | |
| C01B 32/205 | (2017.01) | |
| C01B 3/24 | (2006.01) | |
| C09C 1/48 | (2006.01) | |
| C10G 2/00 | (2006.01) | |
| C25B 1/04 | (2021.01) | |

(52) U.S. Cl.
CPC ............ *B01D 53/0438* (2013.01); *C01B 3/24* (2013.01); *C01B 32/05* (2017.08); *C01B 32/205* (2017.08); *C09C 1/48* (2013.01); *C10G 2/50* (2013.01); *C25B 1/04* (2013.01); *B01D 2253/102* (2013.01); *B01D 2253/106* (2013.01); *B01D 2253/206* (2013.01); *B01D 2257/504* (2013.01); *B01D 2259/40088* (2013.01)

(58) Field of Classification Search
CPC .................................................... C01B 32/05
See application file for complete search history.

(56) References Cited

U.S. PATENT DOCUMENTS

| | | | | |
|---|---|---|---|---|
| 4,452,676 A | * | 6/1984 | Birbara | .................. C01B 32/05 205/628 |
| 5,817,287 A | | 10/1998 | Hurkot | |
| 7,585,434 B2 | * | 9/2009 | Morita | .................. B82Y 30/00 524/495 |
| 8,840,704 B2 | * | 9/2014 | Shoji | ........................ B63G 8/36 95/115 |

FOREIGN PATENT DOCUMENTS

| | | |
|---|---|---|
| EP | 2 682 450 A2 | 1/2014 |
| WO | 2008/148641 A2 | 12/2008 |
| WO | 2011/003081 A1 | 1/2011 |
| WO | 2012/168346 A1 | 12/2012 |
| WO | 2014/170184 A1 | 10/2014 |
| WO | 2015/055349 A1 | 4/2015 |
| WO | 2015/185434 A1 | 12/2015 |
| WO | 2016/005226 A1 | 1/2016 |
| WO | 2016/161998 A1 | 10/2016 |

OTHER PUBLICATIONS

N. Z. Muradov, "How To Produce Hydrogen From Fossil Fuels Without CO2 Emission," Int. J. Hydrogen Energy, 1993, pp. 211-215, vol. 18, No. 3.
L. Fulcheri et al., "From Methane To Hydrogen, Carbon Black and Water," Int. J. Hydrogen Energy, 1995, pp. 197-202, vol. 20, No. 3.
Zhihong Yuan et al., "Toward the Development and Deployment of Large-Scale Carbon Dioxide Capture and Conversion Processes," Ind. Eng. Chem. Res., 2016, pp. 3383-3419, vol. 55.
T. Geissler et al., "Hydrogen production via methane pyrolysis in a liquid metal bubble col. reactor with a packed bed," Chemical Engineering Journal, 2016, pp. 192-200, vol. 299.
Written Opinion of the International Searching Authority of PCT/EP2017/078837 dated Jan. 16, 2018.
International Search Report of PCT/EP2017/078837 dated Jan. 16, 2018.

\* cited by examiner

*Primary Examiner* — Stuart L Hendrickson

(57) ABSTRACT

A process for the production of at least one of amorphous carbon or graphite, preferably of carbon black, from atmospheric air, biogas or flue gas CO2 is given, including at least the following steps:
a) isolation of concentrated CO2 of a concentration of at least 50% v/v from atmospheric air, green house air or flue gas preferably by means of a cyclic adsorption/desorption process on amine-functionalized adsorbents;
b) conversion of said captured CO2 into a gaseous or liquid saturated or unsaturated hydrocarbon by hydrogenation:
c) cracking of said saturated or unsaturated hydrocarbon to at least one of amorphous carbon or graphite, preferably carbon black,
wherein the H2 resulting from step c) is at least partially used in the hydrogenation of step b).

25 Claims, 2 Drawing Sheets

METHODS FOR THE REMOVAL OF CO2 FROM ATMOSPHERIC AIR OR OTHER CO2-CONTAINING GAS IN ORDER TO ACHIEVE CO2 EMISSIONS REDUCTIONS OR NEGATIVE CO2 EMISSIONS

CROSS REFERENCE TO RELATED APPLICATIONS

This application is a National Stage of International Application No. PCT/EP2017/078837 filed Nov. 10, 2017, claiming priority based on European Patent Application No. 16 201 033.4 filed Nov. 29, 2016.

TECHNICAL FIELD

The present invention relates to methods for the removal of CO2 from atmospheric air or other CO2-containing gases such as biogas or flue gases in order to achieve CO2 emissions reductions or negative CO2 emissions.

PRIOR ART

In order to limit climate change to acceptable levels it is not only necessary to reduce CO2 emissions in the near future to zero but also to achieve negative CO2 emissions. More than 87% of modeling scenarios of the Intergovernmental Panel on Climate Change ("IPCC") consistent with 2° C. of warming involve large scale deployments of negative emissions technologies ("NET") on a scale of several gigatons of CO2 annually. Several possibilities exist in order to achieve negative emissions, e.g. combustion of biomaterials for the generation of electricity combined with CO2 capture from the combustion flue gas and subsequent CO2 sequestration ("BECCS"), or the direct air capture of CO2 ("DAC") with 20 machines and subsequent CO2 sequestration. Although underground CO2 sequestration is a technically mature technology per se, concerns exist with regard to safe permanent storage of CO2 underground and most importantly the societal acceptance of underground CO2 sequestration is considered low. Consequently it will be necessary to identify alternatives to underground CO2 sequestration with increased societal acceptance and no concerns with respect to safe permanent storage.

WO2016/161998 discloses a process for the production of synthetically produced methane. Hydrogen from an electrolytic arrangement which is operated by means of regeneratively generated electric energy and carbon dioxide are reacted in a methane synthesis, the carbon dioxide being produced from an air/gas flow by means of a carbon dioxide recovery system by way of a reversible adsorption process. The heat for reversing the adsorption process is taken at least to some extent from the exothermic methane synthesis.

WO2015/055349 discloses a method, comprising: a) an industrial operation plant generating CO2 comprised in a flue gas; said industrial operation plant performing an industrial combustion or calcination process or metallurgical process: b) a CO2 separating unit for separating a CO2 containing gas mixture from the flue gas; c) an electrolysis unit for splitting water by electrolysis to produce H2 and O2; d) a methanation unit for converting the CO2 containing gas mixture and the H2 by a methanation reaction to a methane rich gas which can be used as or upgraded to synthetic natural gas.

The final product in WO2016/161998 and WO2015/055349 is always methane.

N. Z. Muradov, Int. J. Hydr. Ener, 18(3), p211-215 as well as L. Fulcheri et al, Int. J. Hydr. Ener, 20(3), p197-202 disclose the thermocatalytic decomposition of methane to elemental carbon and mention that the elemental carbon can be stored for future use, there is however not in the context of carbon dioxide capture from air.

SUMMARY OF THE INVENTION

The present invention therefore relates to new methods for the removal of CO2 from atmospheric air or other CO2-containing gases such as biogas or flue gases in order to achieve CO2 emissions reductions or negative CO2 emissions.

The solution to the problem is the method to produce at least one of amorphous carbon or graphite, preferably carbon black, in a multi-step method from CO2 captured from atmospheric air or other CO2-containing gases as defined in the claims.

Generally several possibilities exist in order to lastingly eliminate CO2 from atmospheric air or other CO2-containing gases without the need to sequester it the known way, i.e. without the need to store the CO2 underground to remove it from the carbon circle:

One possibility is to consider new and safer ways of removal of the CO2 as such from the system, as alternatives to the underground sequestration of CO2, including deep sea storage or the like.

A further possibility is to react CO2 with secondary substances to yield stable compounds which can be either stored or even commercially used. In this sense e.g. carbonation of alkali compounds as described in U.S. Pat. No. 8,709,151.

A further possibility is to convert the captured CO2 chemically to another molecule which can be safely removed from the carbon circle and stored.

Yet another possibility is to reduce the CO2 molecule to eventually yield elementary carbon in the form of at least one of amorphous carbon or graphite, which is considered as stable, and can either be stored safely and permanently or used in commercial processes.

The straightforward way of achieving this would be the direct one step conversion (reduction) of CO2 into at least one of amorphous carbon or graphite, which however is burdened with some practical obstacles.

The present invention proposes to convert CO2, captured in a DAC process or from other CO2-containing gases such as biogas or flue gases, in a first hydrogenation step to a hydrocarbon moiety, preferably methane, and to, in a subsequent reduction step, convert the hydrocarbon moiety into at least one of amorphous carbon or graphite, in particular into carbon black. Preferably the process involves a parallel H2O cracking to elementary oxygen and to elementary hydrogen.

So far no prior art exists describing the direct air capture of CO2, subsequent conversion of CO2 to hydrocarbons by reacting with hydrogen and final cracking of hydrocarbons to yield at least one of amorphous carbon or graphite and hydrogen in order to achieve CO2 emissions reductions or negative CO2 emissions.

WO2014/170184, WO2015/185434 and WO2016/005226 describe devices and processes for the direct capture of CO2 from ambient air.

EP-A-2682450 describes methods for the production of methane from CO2 and hydrogen via an electrochemical route. WO2011/003081 describes methods for the production of methane from CO2 and hydrogen via a biological route and WO2016/161998 describes methods for the production of methane, other gaseous or liquid hydrocarbon products from atmospheric CO2 and hydrogen via electrochemical routes.

The terminology used of at least one of amorphous carbon or graphite as used in the instant specification shall include allotropic forms of atomic carbon which are different from diamond. Therefore this shall also include fullerenes including buckyballs, carbon nanotubes, carbon nanobuds and nanofibers, glassy carbon, carbon nanofoam and linear acetylenic carbon. It shall also include preferably forms commonly designated as carbon black, activated carbon and the like.

Production of solid carbon from fossil hydrocarbon sources as such is known, e.g. production of carbon black from liquid hydrocarbons in an oven furnace as described in WO2008/148641 or production of carbon black from methane in a brick reactor ("thermal black") as described in U.S. Pat. No. 5,817,287.

As mentioned above, there is no prior art describing the complete process starting from direct air capture of CO2, subsequent conversion of CO2 to hydrocarbons by combination with hydrogen and final cracking of hydrocarbons to yield carbon and hydrogen, in order to achieve CO2 emissions reductions or negative CO2 emissions.

Generally speaking the present invention proposes the following process:

A process for the production of at least one of amorphous carbon or graphite, preferably of carbon black, from atmospheric air, biogas or flue gas CO2 including at least the following steps, preferably in given order:
a) isolation of concentrated CO2 of a concentration of at least 50% v/v from atmospheric air, biogas or flue gas, preferably by means of a cyclic adsorption/desorption process on amine-functionalized adsorbents:
b) conversion of said captured CO2 into a gaseous or liquid saturated or unsaturated hydrocarbon by hydrogenation:
c) cracking of said saturated or unsaturated hydrocarbon to at least one of amorphous carbon or graphite, preferably to carbon black,
wherein the H2 resulting from step c) is at least partially used in the hydrogenation of step b).

At least by way of the provison that the H2 resulting from step c) is at least partially used in the hydrogenation of step b) provides for the fact that steps b) and c) are not a simple juxtaposition. As a matter of fact, it was found unexpectedly that these two steps can most efficiently be connected with each other in terms of efficiency and reliability by crossover feedback use of the generated H2. At least this aspect is not mentioned in any prior art document, the documents only disclose steps a), in some cases in combination with b) but never the combination of a)/b) with c) together with the provison that the hydrogen generated in step c) is used for step b). Further the prior art aims to maximize the yield of both, the hydrogenation of step b) as well as the cracking of step c). Herein it was found that the hydrocarbon is just an intermediate and neither complete conversion in steps b) and c) are required, which further allows efficient combination.

As for the step a), reference is e.g. made to processes as described in WO-A-2016/005226 the disclosure of which is incorporated by way of reference for this step.

As for the step b), reference is e.g. made to processes as described in EP-A-2682450 or WO2016/161998 the disclosure of which is incorporated by way of reference for this step.

As for the step c), reference is e.g. made to processes as described in U.S. Pat. No. 5,817,287 or Geissler et al Chemical Engineering Journal 299 (2016) 192-200 the disclosure of which is incorporated by way of reference for this step.

The saturated or unsaturated hydrocarbon is preferably selected from the group consisting of: linear, branched or cyclic alkanes, linear, branched or cyclic alkenes, alkynes, or a mixture thereof. Further preferably the saturated or unsaturated hydrocarbon is selected from the group consisting of: methane, ethane, propane, butane, ethylene, propene, butylene, or a mixture thereof.

Further H2 required for step b) can preferably be provided via splitting of H2O, wherein the splitting of H2O is preferably a photocatalytic splitting, a photolectrochemical splitting, a radiolysis, a photobiological splitting, (thermal) plasma splitting or an electrolysis, or a combination thereof. Alternatively the H2 required for step b) can be obtained by (thermal) cracking of saturated or unsaturated hydrocarbon, in particular of methane, stemming from fossil or biogenic sources, to yield hydrogen and at least one of amorphous carbon or graphite, where the at least one of amorphous carbon or graphite is further utilized or sequestered.

The saturated or unsaturated hydrocarbon can be selected to be methane, and the further two moles H2 per mole CO2 required for step b) in this case can be provided via (thermal) cracking of the methane to yield hydrogen and carbon, according to step c).

The concentration of the concentrated CO2 provided in step a) is preferably in the range of 50-100% v/v, more preferably in the range of 90-100% v/v.

According to a preferred embodiment, the saturated or unsaturated hydrocarbon is selected to be methane, and cracking of methane in step c) is performed thermally above a temperature of 800° C., preferably above 900° C., most preferably in a range of 1100° C.-1600° C.

The methane cracking in step c) can be performed in an electrically heated reactor, preferably using renewable electricity.

At least one of steps a)-c) is preferably performed continuously and/or cyclically. Preferably the step c), in the form of methane cracking, is carried out continuously.

The saturated or unsaturated hydrocarbon is preferably selected to be methane, and the methane cracking in step c) is performed in a liquid metal reactor, preferably using liquid tin.

Atmospheric source concentrated CO2 is preferably provided in step a) by a cyclic adsorption/desorption process, preferably using an amine-functionalized adsorbent where desorption of CO2 is performed by heating of the adsorbent to above 50° C., preferably above 80° C., more preferably above 90° C., preferably in combination with reducing the pressure to below 500 mbar (abs).

The amine-functionalized adsorbent for the DAC process or to capture from other CO2-containing gases such as biogas or flue gases according to step a) can be a weak ion exchange resin, amine-functionalized cellulose, as described in WO2012/168346, amine-functionalized silica, amine-functionalized carbon or other solid supports featuring amine functions. The amine functions on the solid support can be incorporated either through impregnation or covalent bonds.

The heat stored in the produced carbon and hydrogen in step c) can be used to preheat the hydrocarbon, preferably the methane, entering the reactor of step c) and/or is used to provide heat for the CO2 desorption step of the CO2 capture device in step a).

The heat recovery of products from step c) to serve step a) is not obvious from prior art and further provides for the fact that the process described herein is not a simple juxtaposition.

Parts of the hydrogen needed for step b), in particular in the form of methanation, can be provided by recycling product hydrogen from the methane cracking reaction and the remainder can be supplied by electrolysis of water using electricity, preferably renewable electricity, where electrolysis is performed by either alkali, polymer electrolyte membrane or solid oxide electrolyzers. Alternatively the remainder H2 required for step b) can be obtained by thermal cracking of methane, stemming from fossil or biogenic sources, to yield hydrogen and at least one of amorphous carbon or graphite, preferably carbon black, where at least one of amorphous carbon or graphite, preferably carbon black, is further utilized or sequestered.

The heat release from step b), in particular in the form of methanation reaction, can be used to supply heat for the CO2 desorption step of the CO2 capture device.

The produced at least one of amorphous carbon or graphite, preferably carbon black, can be used e.g. in metallurgy as carburizer for tungsten carbide or silicon carbide, as reducing agent for solar grade silicon, as rubber filler, as addition for refractory bricks, as black pigment in plastics or concrete, as high temperature insulation, as asphalt or concrete binder or as construction aggregate or sequestered above or underground.

The present invention thus in particular relates to methods for the production of at least one of amorphous carbon or graphite, preferably carbon black, from atmospheric CO2 in order to achieve CO2 emissions reductions or negative CO2 emissions. In a preferred embodiment the at least one of amorphous carbon or graphite, preferably carbon black, is produced from atmospheric CO2 provided via an adsorption/desorption process on amine-functionalized adsorbents, further providing H2 via electrolysis of H2O, subsequent methanation of CO2 and H2 to yield CH4 and finally cracking of CH4 to yield carbon and hydrogen, where the hydrogen is recycled back to the methanation reaction step, schematically shown in FIG. 2.

The individual reaction schemes are:
1. CO2 capture from air providing concentrated CO2.
   The thermodynamic minimum energy demand for capturing CO2 from air is roughly +20 kJ/mol C. Real DAC systems show energy requirements of above 150 kJ/mol C.
2. Electrolysis of water to yield H2 and O2:

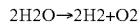
   $$2H_2O \rightarrow 2H_2 + O_2$$

The enthalpy of formation of water is +242 kJ/mol H2O at 25° C. and 101 kPa. According to FIG. 2 two moles of hydrogen are required from electrolysis for the production of one mole of carbon (the remaining hydrogen is recycle from methane cracking) yielding a total theoretical enthalpy change of 484 kJ per mole of carbon for the water cracking.
3. Methanation of CO2 and H2 to yield CH4:

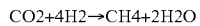
   $$CO_2 + 4H_2 \rightarrow CH_4 + 2H_2O$$

Methanation proceeds exothermically with an enthalpy change of −165 kJ/mol C (at standard conditions of 25° C. and 101 kPa).
4. Cracking of methane to yield C and H2

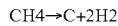
   $$CH_4 \rightarrow C + 2H_2$$

Cracking of methane proceeds endothermically with an enthalpy change of +75 kJ/mol C (at standard conditions of 25° C. and 101 kPa).

The enthalpies of formation of the individual process steps are schematically summarized in FIG. 3.

Summing up the enthalpies of formation of all process steps yields (excluding the energy required to supply concentrated CO2 via DAC):

484 kJ/mol C (electrolysis)−165 kJ/mol C (methanation)+75 kJ/mol C (methane cracking)==+394 kJ/mol C which equals the enthalpy of formation of CO2 (at 25° C. and 101 kPa), so that the proposed method is in alignment with thermodynamic principles.

Due to the high number of process steps of above suggested CO2 splitting route the overall method might be considered energetically inefficient and consequently not economical. Surprisingly it was however found that above process steps can be combined in an energetically favorable manner yielding an overall economical method for splitting of CO2. The overall energy consumption per mole of atmospheric CO2 split to C of an energetically favorable technical process implementation is:
1. CO2 capture from air via an adsorption/desorption process on amine-functionalized adsorbents, where CO2 desorption is performed by heating the adsorbent: >150-300 kJ/mol C, where >25 kJ/mol C are required in the form of electricity and the remainder in the form of heat at 50-120° C.
2. Electrolysis of H2O using renewable electricity:
   Industrially available alkali or polymer electrolyte membrane electrolysis works with an efficiency of 65-75%, emerging solid oxide electrolysis with an efficiency of up to 85%, so that for the electrolysis 570-740 kJ/mol C are required, depending on the type of electrolysis used. For solid oxide electrolysis another 41 kJ/mol H2O of heat input have to be added for evaporation of H2O prior to electrolysis.
3. Methanation of CO2 and H2:
   Methanation proceeds without significant conversion losses. For technical systems heat losses and heat exchange efficiencies are considered so that in total 90% of the exothermic heat release (amounting to −149 kJ/mol C) can be recovered and used to supply a large share of the energy demand of the DAC system.
4. Cracking of methane:
   Cracking of methane proceeds without significant conversion losses. For technical systems heat losses and heat exchange efficiencies are considered so that in total the heat requirement is 85 kJ/mol C. Further a technical system requires heating of the educts to the specified reaction temperature. The resulting products leave the reactor at the specified reaction temperature and heat stored in the products can be recovered for heat regeneration processes as further laid out below.

Consequently an energetically favorable technical process implementation is considered to consume a minimum energy input of roughly 750 kJ/mol C. Preferably such energy input is in the form of renewable electricity.

When using above described process to produce at least one of amorphous carbon or graphite, preferably carbon black, for further utilization and consequently comparing above process to existing cracking of fossil methane (thermal black) reveals that above process is energetically more favorable per mol of C obtained. In order to obtain 1 mol of C by thermal cracking of fossil methane 1 mol of CH4 needs to be supplied, which has a standard (25° C., 101 kPa) net enthalpy of combustion (assuming the combustion products are gaseous) of 803 kJ/mol CH4, which can be considered as the energy input into the process. The released hydrogen is combusted and used to heat the methane cracking reactor and the remainder of the heat is dissipated or in rare cases used for district heating networks. If renewable electricity has the same cost or even lower than fossil CH4 per energy value than above process implementation can be economically more favorable, which is surprising.

Further comparing above process for the production of at least one of amorphous carbon or graphite, preferably carbon black, for further utilization to the conventional process of e.g. thermal black production reveals that due to the high purity of CO2 captured from the atmosphere and the consequently high purity of the CH4 produced through hydrogenation of atmospheric CO2, the resulting at least one of amorphous carbon or graphite, in particular in form of carbon black, has high purity offering economic advantages.

The major motivation for above process is the goal of CO2 emissions reductions or the creation of negative CO2 emissions. Comparing above process to other processes to achieve emissions reductions, e.g. the production of renewable methane from atmospheric CO2, the comparison reveals that per mole of CH4 produced from atmospheric CO2 and renewable H2 energy input of well above 1300 kJ/mol CH4 is required, which is significantly higher than the energy consumption of above described process. Therefore the above process offers significant, inter alia economic advantages for CO2 emissions reductions or negative CO2 emissions.

It is surprising that subsequent splitting of CH4 reduces total process energy consumption, majorly due to the possibility to recycle H2, which in the process described above does not need to be combusted in order to supply process heat. Process heat is rather more efficiently provided by renewable electricity reducing conversion losses.

So far no industrial technologies for direct splitting of CO2 are available. In contrary all process steps of the herein described method can be implemented on an industrial scale, allowing splitting of atmospheric CO2 via the proposed route of methanation and subsequent methane cracking. This patent application describes important embodiments for energy and cost efficient combination of all process steps.

Cracking of methane to yield carbon and hydrogen as such is well known and industrial-scale technology and is available supplying roughly 100'000 tons of thermal black for market applications annually. Industrial processes for the production of thermal black rely on a batch process, where in a first step a brick reactor is heated by the combustion of hydrogen and once it reaches the desired reaction temperature, methane is introduced, which decomposes on the hot brick walls to yield C and H2. Once the brick temperature drops below a threshold value the methane feed is stopped and switched to a second brick reactor, which was heated by combustion of hydrogen supplied as product from the first brick reactor. Although the existing industrial technology for methane cracking would work for the method proposed in this patent application, it is preferred to use electricity, preferably renewable electricity, in order to supply the heat for the methane cracking reaction, rather than burning the produced hydrogen, in order to achieve high system efficiencies. Further it is favorable to use a continuous methane cracking process rather than a batch process in order to avoid cyclic heating and cooling of the reactor and rather achieve constant product output. Concepts of continuous methane cracking reactors which can be heated by electricity are known in the scientific literature, as e.g. reported in Chemical Engineering Journal 299 (2016) 192-200.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

FIG. 1a shows the most general conversion scheme for the sequence DAC (or capturing from other CO2-containing gases such as biogas or flue gases)→hydrocarbon→elementary carbon in the form of at least one of amorphous carbon or graphite, in particular of carbon black. The first step is the step of direct air capture, either directly from the atmosphere with a CO2 content in the range of above 350 ppm v/v or from flue gas with a CO2 content in the range of 2-20% v/v, or 5-15% v/v, or from biogas with a CO2 content in the range of 30-70% v/v, or 40-55% v/v. The isolated CO2, in liquid or gaseous form, is the subjected to a step of hydrogenation to a hydrocarbon. Depending on the type of reaction of the hydrogenation a further supply of H2 beyond the ½ nH2 indicated may be required. In the following step the hydrocarbon is cracked to at least one of amorphous carbon or graphite, preferably carbon black.

FIG. 1b) shows one possible implementation of such a process where the hydrocarbon into which the captured CO2 is converted is alkene.

Figure 1:
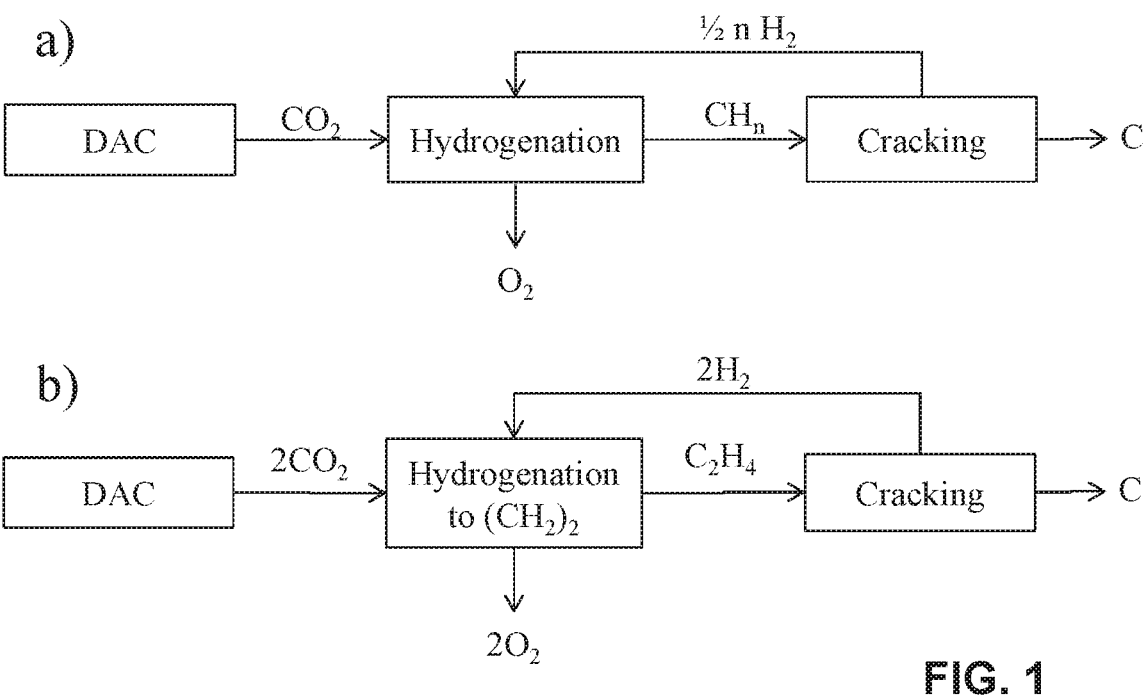
FIG. 1 shows in a) the most general conversion scheme involving DAC and subsequent conversion via a hydrocarbon to elementary carbon and in b) the situation where the hydrocarbon is alkene so as to have a closed stoichiometry.
Figure 2:
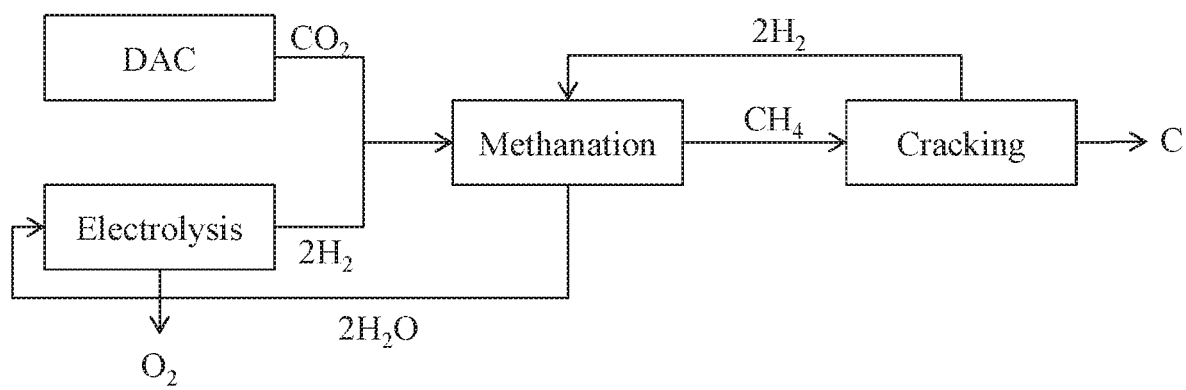
FIG. 2 a material flow diagram of the method for the production of carbon from atmospheric CO2 via methanation.

In both cases of FIGS. 1 a) and b) the elementary oxygen resulting from the hydrogenation process is either obtained directly or indirectly. In case where the oxygen is obtained indirectly this usually means that first water results from the hydrogenation which water is subsequently split into hydrogen and oxygen, and the hydrogen of that splitting is used again in the hydrogenation process as illustrated in FIG. 2. It is also possible that the water resulting from the hydrogenation process is removed from the system and the additional hydrogen required in the hydrogenation process in this case where water is generated is provided by a different source, e.g. by cracking of additional hydrocarbon from a different source.

FIG. 2 schematically shows the situation where the conversion takes place via methane as the hydrocarbon. In this case per mole C two additional moles H2 are required for the methanation, which are made available via a step of cracking H2O, again offering the benefit of having a closed system and, as in case of the scheme according to FIG. 1b, a total overall reaction equation of $$CO_2 \rightarrow C + O_2$$

Figure 3:
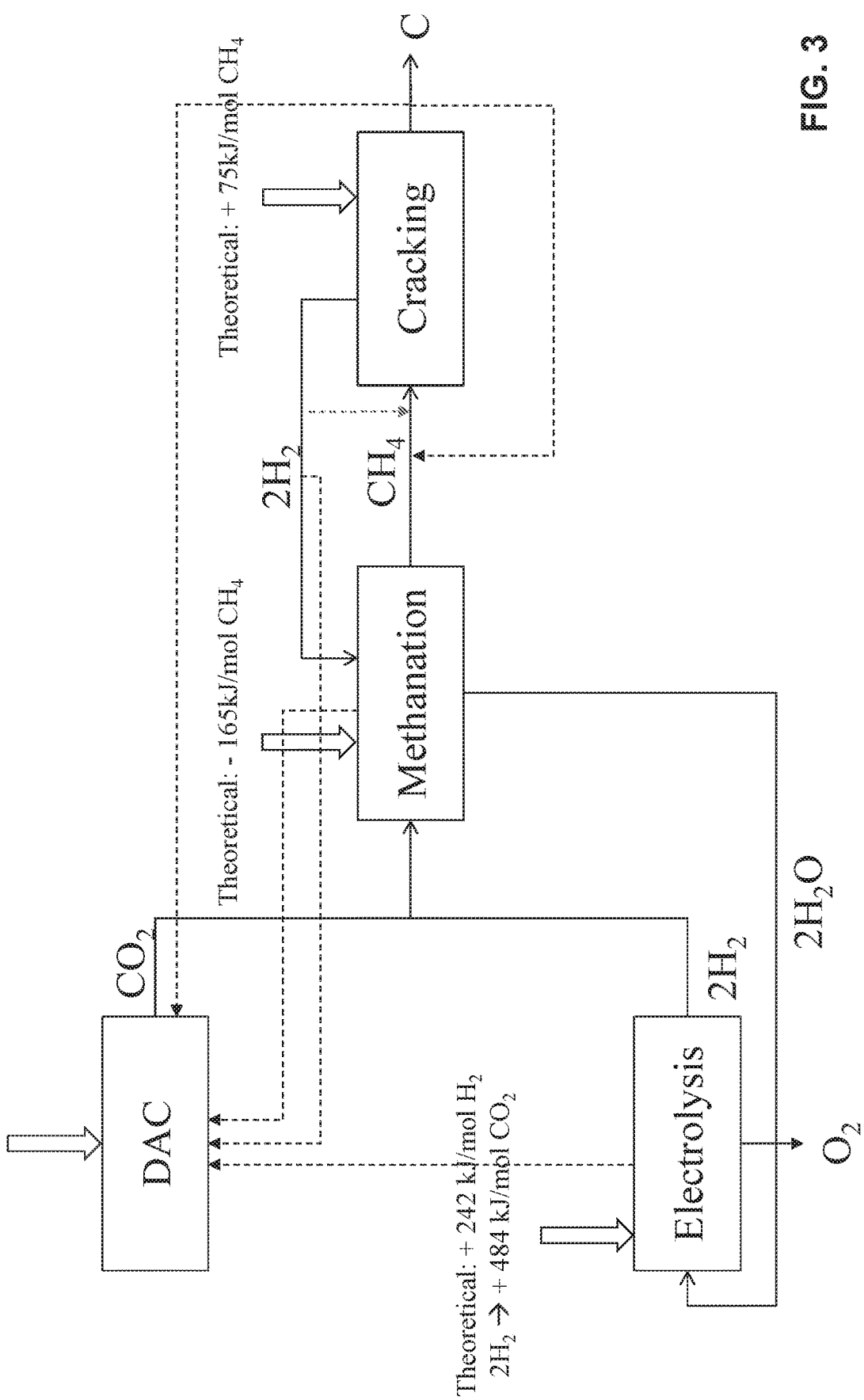
FIG. 3 shows the energy consumption of the process steps of the method for the production of carbon from atmospheric CO2, wherein all enthalpy of formation values are considered at standard states of 25° C. and 101 kPa.

FIG. 3 finally shows the scheme according to FIG. 2 with the thermodynamic considerations showing the unexpected economic feasibility of the process using the methanation route. Given with solid arrows are the material transport pathways, dashed arrows indicate possible heat transport pathways allowing for an overall optimized thermal structuring of the process for optimum energy use, as will also be detailed further below.

Example 1. Heat Recovery from Produced Carbon and Hydrogen

The carbon produced by cracking of methane is leaving the cracking reactor as either hot carbon aerosol or hot carbon particles, which roughly have the same temperature as the methane cracking reactor temperature. The carbon product particles or carbon product aerosol have to be cooled before final collection e.g. through water sprays. The heat transferred from the hot particles or hot aerosol to the water can be collected as steam or hot water, which can then be subsequently used to e.g. supply heat for the operation of the DAC plant. The heat capacity of carbon is 8.5 J/mol/K. Assuming the methane cracking reactor is operated at 1550° C., which is also roughly the temperature of the carbon product, and the carbon product is subsequently cooled to 100° C., the heat which can be recovered from cooling the carbon product is (8.5 J/mol carbon/K*1450K)=12.3 kJ/mol carbon.

Similarly to the carbon product the hydrogen leaving the cracking reactor is cooled together with carbon product. It is possible to cool the hydrogen to a final temperature of 150-300° C., which is a possible operation temperature range of the methanation reactor, so that heating of at least parts of the methane is avoided. Different final cooling temperatures of carbon and hydrogen can be achieved by separation of hydrogen and carbon, e.g. through a cyclone. The isobaric heat capacity of hydrogen is 28.8 J/mol/K. Assuming the methane cracking reactor is operated at 1550° C. and the hydrogen product is cooled to 250° C., the heat which can be recovered from cooling the hydrogen product is (28.8 J/mol H2/K*1300 K*2 mol H2/mol carbon)=74.9 kJ/mol carbon.

The heat recovered from cooling the carbon and hydrogen product can be used to supply heat for the DAC plant, which requires heat at around 80-120° C. for the CO2 desorption process, as further described in WO2016/005226. The total amount of heat which can be supplied from cooling the carbon and hydrogen product is 12.3 kJ/mol carbon+74.9 kJ/mol carbon=87.2 kJ/mol carbon, which can supply a significant part of the thermal energy requirement of the DAC process. Alternatively a part of the heat from the carbon and hydrogen product can be used to pre-heat the methane input into the methane cracking reactor, however, this process layout is technically more challenging (possibility of carbon black deposits in the heat exchanger, slow indirect gas to gas heat exchange process).

Example 2. Heat Recovery from Methanation

Methanation proceeds according to the following reaction scheme:

$$CO_2 + 4H_2 \rightarrow 2H_2O + CH_4$$

Methanation is an exothermic reaction providing 165 kJ of heat per mole of CH4 produced. Depending on the type of methanation used, the heat is released at different temperatures, e.g. if chemical methanation system is used the reaction occurs at a temperature of 150-300° C. and if biological methanation system is used the reaction occurs at a temperature of 50-100° C. Chemical methanation systems are especially interesting since heat release is at a temperature sufficiently high, so that the supplied heat can be used to provide heat for the DAC plant, as described in Example 1.

Example 3. Recycling of Hydrogen from Methane Cracking to Methanation Reactor

The methane cracking reaction, e.g. according to the process as proposed by Geissler et al in Chemical Engineering Journal 299 (2016) 192-200, yields two moles of hydrogen per one mole of carbon produced, according to the following reaction scheme:

$$CH_4 \rightarrow C + 2H_2$$

State of the art carbon black processes combust the produced hydrogen to provide heat for the methane cracking reaction as well as other process heat. In order to reduce electricity consumption for the electrolysis of water, it is favorable to separate the product hydrogen from the product carbon and feed the hydrogen back to the methanation reactor, which works according to the reaction scheme provided in Example 2. If two moles of hydrogen from methane cracking are fed back to the methanation reactor, two moles of hydrogen have to be supplied from electrolysis instead of 4 moles of hydrogen which would be necessary if no hydrogen recycling was implemented. Due to the relatively high energy demand for the electrolysis of water (286 kJ/mol H2O), recycling of hydrogen from methane cracking to methanation reactor is energetically highly favorable.

If product hydrogen from methane cracking contains remainders of methane, such methane can also be fed back to the methanation reactor, keeping system complexity for the hydrogen recycling step low.

The invention claimed is:

1. A method for the production of at least one of amorphous carbon or graphite from atmospheric air CO2 comprising at least the following steps:
   a) isolation of concentrated CO2 of a concentration of at least 50% v/v from atmospheric air performed by means of a cyclic adsorption/desorption process on solid support amine-functionalized adsorbents selected from the group consisting of (i) a weak ion exchange resin, (ii) an amine-functionalized cellulose, (iii) an amine-functionalized silica, and (iv) an amine-functionalized carbon,
   wherein the amine functions on the solid support amine-functionalized adsorbent are incorporated through covalent bonds, and
   wherein desorption of CO2 is performed by heating of the adsorbent to above 80° C.;
   b) conversion of said concentrated CO2 into a gaseous or liquid saturated or unsaturated hydrocarbon by hydrogenation; and
   c) cracking of said saturated or unsaturated hydrocarbon to yield H2 and at least one of amorphous carbon or graphite and sequestering the produced at least one of amorphous carbon or graphite underground,
   wherein the H2 resulting from step c) is at least partially used in the hydrogenation of step b), and wherein either one or a combination of the following is used to supply heat for CO2 desorption in step a):
heat stored in the produced carbon and/or hydrogen in step c), and
heat released from step b).

2. The method according to claim 1, wherein the saturated or unsaturated hydrocarbon is selected from the group consisting of: linear, branched or cyclic alkanes, linear, branched or cyclic alkenes, alkynes, or a mixture thereof.

3. The method according to claim 1, wherein further H2 required for step b) is provided via splitting of H2O.

4. The method according to claim 1,
wherein further H2 required for step b) is provided via cracking of saturated or unsaturated hydrocarbon from fossil or biogenic sources in a step according to step c).

5. The method according to claim 1,
wherein the saturated or unsaturated hydrocarbon is selected to be methane, and wherein the further two moles H2 per mole CO2 required for step b) is provided via splitting of H2O.

6. The method according to claim 1, wherein heat release from step b), in the form of methanation reaction, is used to supply heat for the CO2 desorption step of the CO2 capture device.

7. The method according to claim 1,
wherein the saturated or unsaturated hydrocarbon is selected to be methane, and wherein cracking of methane in step c) is performed thermally above a temperature of 800° C.

8. The method according to claim 7,
wherein methane cracking in step c) is performed in an electrically heated reactor.

9. The method according to claim 1, where at least one of steps a)-c) is performed continuously and/or cyclically.

10. The method according to claim 1,
wherein the saturated or unsaturated hydrocarbon is selected to be methane, and
wherein methane cracking is step c) is performed in a liquid metal reactor.

11. The method according to claim 1, wherein atmospheric CO2 is provided in step a) by an adsorption/desorption process using an amine-functionalized adsorbent where desorption of CO2 is performed by heating of the adsorbent to above 90° C., without or in combination with reducing the pressure to below 500 mbar (abs).

12. The method according to claim 1,
wherein the heat stored in the produced carbon and/or hydrogen in step c) is used to preheat methane, entering the reactor of step c) and/or is used to provide heat for the CO2 desorption step of the CO2 capture device in step a).

13. The method according to claim 1,
wherein parts of the hydrogen needed for step b), is provided by recycling product hydrogen from the saturated or unsaturated hydrocarbon cracking reaction in step c), and a remainder of needed hydrogen is supplied by electrolysis of water using electricity, where electrolysis is performed by either alkali, polymer electrolyte membrane or solid oxide electrolyzers, and/or
wherein the remainder hydrogen is supplied by cracking according to step c), of saturated or unsaturated hydrocarbon, from fossil or biogenic sources.

14. The method according to claim 1,
wherein the saturated or unsaturated hydrocarbon is selected to be methane, and
wherein methane cracking is step c) is performed in a liquid metal reactor, using liquid tin.

15. The method according to claim 1, where the produced at least one of amorphous carbon or graphite is used in metallurgy as carburizer for tungsten carbide or silicon carbide, as reducing agent for solar grad silicon, as rubber filler, as addition for refractory bricks, as black pigment in plastics or concrete, as high temperature insulation, as asphalt or concrete binder or as construction aggregate or it is safely sequestered above or underground.

16. The method according to claim 1 for the production of carbon black, from atmospheric air, including at least the following steps:
a) isolation of concentrated CO2 of a concentration of at least 50% v/v from atmospheric air;
b) conversion of said captured CO2 into a gaseous or liquid saturated or unsaturated hydrocarbon by hydrogenation;
c) cracking of said saturated or unsaturated hydrocarbon to yield H2 and carbon black,
wherein the H2 resulting from step c) is at least partially used in the hydrogenation of step b).

17. The method according to claim 16, where the produced carbon black is used in metallurgy as carburizer for tungsten carbide or silicon carbide, as reducing agent for solar grad silicon, as rubber filler, as addition for refractory bricks, as black pigment in plastics or concrete, as high temperature insulation, as asphalt or concrete binder or as construction aggregate or it is safely sequestered above or underground.

18. The method according to claim 1,
wherein the saturated or unsaturated hydrocarbon is selected from the group consisting of: methane, ethane, propane, butane, ethylene, propene, butylene, or a mixture thereof.

19. The method according to claim 1,
wherein further H2 required for step b) is provided via splitting of H2O,
wherein the splitting of H2O is a photocatalytic splitting, a photoelectrochemical splitting, a radiolysis, a photobiological splitting, (thermal) plasma splitting or an electrolysis, or
a combination thereof.

20. The method according to claim 1,
wherein further H2 required for step b) is provided via thermal cracking of saturated or unsaturated hydrocarbon in a step according to step c), said saturated or unsaturated hydrocarbon stemming from fossil or biogenic sources,
wherein the produced carbon is further used in metallurgy as carburizer for tungsten carbide or silicon carbide, as reducing agent for solar grad silicon, as rubber filler, as addition for refractory bricks, as black pigment in plastics or concrete, as high temperature insulation, as asphalt or concrete binder or as construction aggregate or it is safely sequestered above or underground.

21. The method according to claim 1,
wherein further H2 required for step b) is provided via thermal cracking of methane from fossil or biogenic sources, in a step according to step c).

22. The method according to claim 1,
wherein the saturated or unsaturated hydrocarbon is selected to be methane, and wherein the further two moles H2 per mole CO2 required for step b) is provided via splitting of H2O,
wherein the splitting of H2O is a photocatalytic splitting, a photoelectrochemical splitting, a radiolysis, a photobiological splitting, (thermal) plasma splitting or an electrolysis, or a combination thereof.

23. The method according to claim 1, where isolation of concentrated CO2 of a concentration of at least 50% v/v from atmospheric air in step a) is performed by means of a cyclic adsorption/desorption process on amine-functionalized adsorbents,
- wherein the concentration of the concentrated CO2 provided in step a) is in the range of 50-100% v/v, or in the range of 90-100% v/v.

24. The method according to claim 1,
- wherein the saturated or unsaturated hydrocarbon is selected to be methane, and
- wherein cracking of methane in step c) is performed thermally above 900° C., or in a range of 1100° C.-1600° C.

25. The method according to claim 1, wherein the step c) in the form of methane cracking is carried out continuously.

* * * * *